United States Patent [19]

Abe et al.

[11] Patent Number: 5,725,966

[45] Date of Patent: Mar. 10, 1998

[54] HEAT SENSITIVE JACKET LABEL FOR BATTERY AND BATTERY WITH THE SAME

[75] Inventors: Masanobu Abe; Takeshi Okubo, both of Hirakata; Carl David Walton, Kadoma; Junichi Asaoka, Ikoma; Yasuhiko Shoji, Higashiosaka; Tetsuo Hata, Hirakata; Masakazu Hirayama, Higashiosaka; Takeshi Kyogane, Nishinomiya, all of Japan

[73] Assignees: Matsushita Electric Industrial Co., Ltd., Osaka-Fu, Japan; Fuji Seal Inc., Osaka, Japan

[21] Appl. No.: 777,435

[22] Filed: Dec. 30, 1996

[30] Foreign Application Priority Data

Jan. 25, 1996 [JP] Japan ................... 8-10903
Feb. 29, 1996 [JP] Japan ................... 8-43291
May 10, 1996 [JP] Japan ................... 8-116111

[51] Int. Cl.$^6$ ................................... H01M 2/02
[52] U.S. Cl. ............... 429/167; 428/347; 428/354
[58] Field of Search ........................ 429/167, 163; 428/343, 344, 347, 354; 40/306, 630, 638; 206/497; 156/86

[56] References Cited

U.S. PATENT DOCUMENTS

| | | | |
|---|---|---|---|
| 4,801,514 | 1/1989 | Will et al. | 429/167 |
| 5,292,566 | 3/1994 | Shacklett, III | 429/167 X |
| 5,368,953 | 11/1994 | Zaberney et al. | 429/90 |

FOREIGN PATENT DOCUMENTS

| | | |
|---|---|---|
| 59-123160 | 7/1984 | Japan. |
| 59-123161 | 7/1984 | Japan. |
| 2-195644 | 8/1990 | Japan. |

*Primary Examiner*—Anthony Skapars
*Attorney, Agent, or Firm*—Panitch Schwarze Jacobs & Nadel, P.C.

[57] ABSTRACT

A heat sensitive jacket label for a battery is disclosed. It comprises a base made of a heat-shrinking film, a metal layer provided on a back surface of the base, a heat-resistant insulating layer provided on the metal layer, and a heat sensitive adhesive on the insulating layer. The base heat-shrinks at a temperature at least 15° C. higher than a temperature for effecting adhesion of the heat sensitive adhesive.

13 Claims, 3 Drawing Sheets

HEAT SENSITIVE JACKET LABEL FOR BATTERY AND BATTERY WITH THE SAME

BACKGROUND OF THE INVENTION

The present invention relates to a heat sensitive jacket label for a battery, and an improvement in a battery with such a heat sensitive jacket label.

The sizes of batteries such as outer diameters and lengths are standardized in the JIS (Japanese Industrial Standards) or IEC. Therefore, the achievement of a battery having a higher capacity depends on a successful decrease in the volume of the jacket.

In order to reduce the jacket volume, the conventional metal jacket has been replaced by a jacket label which consists of a heat-shrinking resin film as its base, a print layer formed on one surface of the base, and a pressure sensitive adhesive layer formed on the other surface of the base. This jacket label is applied to a dry battery by wrapping it around the outer circumference of the dry battery with the adhesive layer inward, and then heat-shrinking the base to cling to the dry battery. The jacket label is thinner than the conventional metal jacket, so that the dry battery can have a much larger capacity.

However, this type of jacket label has the following drawback. When the jacket label is applied to a dry battery, the adhesive layer which is formed on the other surface of the base has a release paper on its surface. The release paper, which is useless to a battery, not only raises the cost of the battery but also requires troublesome peeling off, which accordingly decreases the operation efficiency.

In order to dispense with a release paper, a hot melt adhesive or a heat sensitive adhesive is now used as a heat sensitive jacket label. Since the heat sensitive adhesive remains nonadhesive unless a certain degree of heat is applied, no release paper is needed.

However, the heat sensitive jacket label also has other drawbacks as follows. When the heat sensitive adhesive is activated at too high a temperature, the heat-shrinking resin film which is used as the base shrinks. This causes the jacket label to have wrinkles or distortion when it is wrapped around the dry battery, which deteriorates its appearance. On the other hand, when the heat sensitive adhesive is activated at too low a temperature, the jacket label is applied before the heat sensitive adhesive becomes sufficiently adhesive, which causes defective adhesion.

Furthermore, this type of jacket label is provided with a metal deposit layer such as aluminum on the back surface of the base in order to give a high metallic gloss to the jacket label, and accordingly to enhance the appearance of the print on the base surface.

However, if a heat sensitive adhesive is used instead of a pressure sensitive adhesive in a jacket label including an aluminum deposit layer, the deposited aluminum dissolved while the battery being preserved. Consequently, the metallic gloss is lost and the appearance of the jacket label is accordingly deteriorated.

The dissolution of aluminum results from the development of small pinholes on the heat sensitive adhesive layer while the heat sensitive adhesive is heat-melted and then cooled to make the jacket label stick on a metal case. When the heat sensitive adhesive layer has such pinholes, moisture in the air forms local cells between the deposited aluminum and the surface of the battery case which is made of iron or nickel plated steel in the case of an alkaline dry battery. As a result, aluminum is dissolved. The dissolution often occurs particularly under high-temperature and high-humidity conditions.

BRIEF SUMMARY OF THE INVENTION

The primary object of the present invention is to provide a heat sensitive jacket label for a battery which is economical and enough applicable to the battery, and has a good appearance, without the above-described problems that are caused by the use of a heat sensitive adhesive.

Another object of the present invention is to provide a battery with a jacket label which has no change in quality and keeps good appearance with metallic gloss while the battery is under preservation.

The present invention provides a heat sensitive jacket label for a battery comprising a heat-shrinking synthetic resin film as its base and a heat sensitive adhesive layer provided on one surface of the base, and the temperature for the base to heat-shrink is at least 15° C. higher than the temperature for the heat sensitive adhesive layer to develop adhesion.

In a preferred mode of the present invention, the heat sensitive jacket label for a battery further comprises a metal deposit layer provided on one surface of the base, and a heat-resistant electrically insulating layer provided on the metal deposit, and the above-mentioned heat sensitive adhesive layer is provided on the heat-resistant electrically insulating layer.

In another preferred mode of the present invention, the heat sensitive jacket label for a battery further comprises a metal deposit layer made of silver, tin, or nickel and the above-mentioned heat sensitive adhesive layer is provided on the metal deposit layer.

Further the present invention provides a battery with the above-described heat sensitive jacket label.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention is directed to a heat sensitive jacket label for a battery which includes a heat-shrinking synthetic resin film as its base and a heat sensitive adhesive layer with which the base adheres on the battery, and also directed to a battery with such a heat sensitive jacket label.

In the present invention, materials for the base and the heat sensitive adhesive layer are so selected that the temperature for inducing a heat-shrink of the base is higher than the temperature for effecting adhesion of the heat sensitive adhesive layer by at least 15° C.

The temperature for inducing a heat-shrink of the base refers to a temperature at which the base shrinks at least 1%.

It is preferable that the temperature for inducing a heat-shrink of the base is higher than the temperature for the heat sensitive adhesive layer to become adhesive by at least 20° C.

It is preferable that the temperature for the heat sensitive adhesive layer to become adhesive, that is, to be activated is 60° C. or above.

As far as the temperature for the base to heat-shrink is higher than the temperature for the heat sensitive adhesive layer to become adhesive by at least 15° C., there is no fear of the base heat-shrinking even when the heat sensitive adhesive layer is heated up to a temperature high enough to become adhesive. Therefore, the jacket label can be adhered to a battery without the base heat-shrinking. The jacket label is applied to the battery when the temperature is heated high enough for the base to heat-shrink. After this, the heat sensitive jacket label is stuck to the battery without wrinkles or distortion on the printed area and has a good appearance.

In the battery with a heat sensitive jacket label of the present invention, a metal layer is provided to give a high metallic gloss at the back surface of the base. The metal layer is prevented from corroding by providing a heat-resistant electrically insulating layer between the metal layer and the heat sensitive adhesive layer. As another method of preventing the corrosion, the metal layer can be made of silver, tin, or nickel, which is more noble than the material for the battery case.

The heat sensitive jacket label is applicable to primary batteries such as cylindrical manganese dry batteries, alkaline batteries, and lithium batteries and also to secondary batteries such as nickel-metal hydride storage batteries, and lithium ion batteries.

The heat sensitive jacket label and the battery with the heat sensitive jacket label of the present invention will be described as follows with reference to the drawings.

Figure 1:
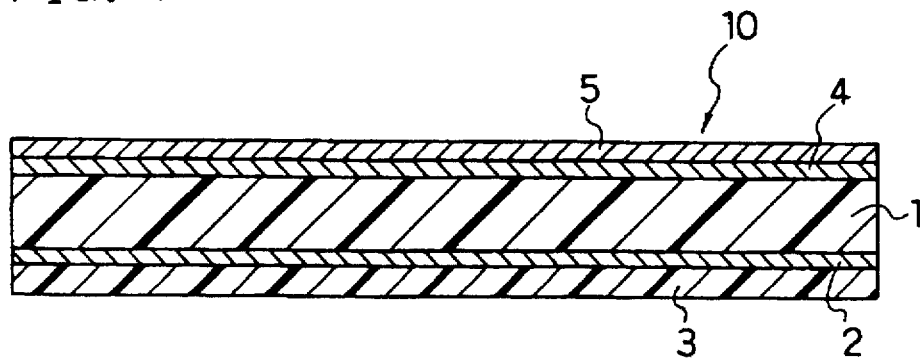
FIG. 1 is a sectional view of the construction of a heat sensitive jacket label of the present invention.

FIG. 1 shows the construction of a heat sensitive jacket label of the present invention. The heat sensitive jacket label 10 is composed of a base 1, a metal layer 2, a heat sensitive adhesive layer 3, a print layer 4, and a varnish layer 5. The base 1 is made of a heat-shrinking resin film such as polyethylene terephthalate. The metal layer 2 is formed on the back surface of the base 1 by depositing aluminum or another metal. The heat sensitive adhesive layer 3 is provided beneath the metal layer 2. The print layer 4 is formed on the front surface of the base 1. The varnish layer 5 is formed on the outer surface of the print layer 4 by spreading varnish thereon.

The heat-shrinking resin film which composes the base 1 can be a mono- or multi-layered film which is made of polyester such as polyethylene terephthalate, polyvinyl chloride, polyethylene, polypropylene, or polyamide. The preferable thickness of the film is 10 to 200 μm, and more preferably 30 to 60 μm. Among these materials, polyester such as polyethylene terephthalate is most suitable for the base 1 because it has excellent strength and rigidity, and generates no poisonous gas when it is burned. The heat-shrinking film is formed by being uniaxially or biaxially oriented so that it can shrink largely in the circumferential direction of a battery when the film is wrapped around it.

The metal layer 2 is formed by vacuum depositing aluminum in a thickness of about 0.01 to 0.1 μm.

The heat sensitive adhesive layer 3 can be a mixture of one or more hot melt resins and various additives. The hot melt resins include an ethylene-vinylacetate copolymer, an ethylene-acrylic acid copolymer, an ethylene-methacrylic acid copolymer, an ionomer, and low-density polyethylene. The additives include tackifiers such as terpene resin and petroleum resin, a plasticizer, a stabilizer, and a lubricant.

It is optional to provide an anchor coat layer on the base 1 and on the aluminum deposit layer 2 in order to improve the adhesion between the base 1 and the aluminum deposit layer 2 and between the aluminum deposit layer 2 and the heat sensitive adhesive layer 3, respectively.

The print layer 4 has some designs such as a brand name or illustration which has been formed by the relief rotary printing, the silk-screen printing, the gravure printing, or another well-known printing method. Another anchor coat layer may be provided between the print layer 4 and the base 1 for the same reason as described above.

The printing ink to be used for the print layer 4 can be of any kind. When an ultraviolet-setting ink having excellent heat-resistance is used, the print layer 4 is hardly damaged by the heat when the heat sensitive adhesive layer 3 is activated or the base 1 heat-shrinks.

The varnish layer 5 is composed of transparent varnish which protects the print layer 4 and also gives it a high gloss. The transparent varnish can be of any kind such as the widely-used synthetic resin. When heat-resistant varnish such as ultraviolet-setting varnish is used, the print layer 4 is hardly damaged by the heat like the ultraviolet-setting ink.

The following is a description of the manufacturing method of the heat sensitive jacket label 10 which has the above-described construction.

Firstly, the aluminum deposit layer 2 is formed by vacuum depositing aluminum in a thickness of about 0.05 μm on a surface of the base 1 which is made of a heat-shrinking polyethylene terephthalate film having a thickness around 50 μm. The film for the base 1 has been subjected to a drawing or stretching process at an appropriate rate so that it can heat-shrink in the longitudinal direction.

Then, an anchor coat agent is spread over the surface on which aluminum has been deposited. The heat sensitive adhesive layer 3 is formed on the surface of the anchor coat by melting and extruding a hot melt resin in a thickness of 20 μm. The hot melt resin is mainly composed of an ethylene-vinylacetate copolymer. Then, the print layer 4 is formed on the other surface of the polyethylene terephthalate film by printing various display designs with the use of a relief rotary printer. The varnish layer 5 is formed by spreading transparent varnish over the surface of the print layer 4.

In this way, a number of heat sensitive jacket labels are formed on the rolled film, and the film is cut at predetermined positions so as to obtain the heat sensitive jacket label 10. The film is so cut that the longitudinal direction of the film corresponds to the circumference of the heat sensitive jacket label 10.

Figure 2:
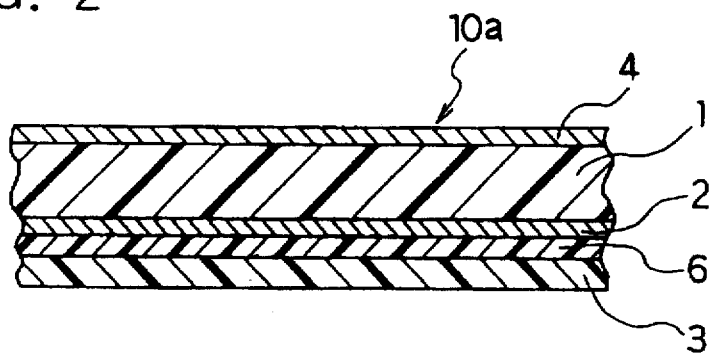
FIG. 2 is a sectional view of the construction of another heat sensitive jacket label of the present invention.

The following is a description of another heat sensitive jacket label 10a of the present invention which is shown in FIG. 2.

The basic difference between the heat sensitive jacket label 10 and the heat sensitive jacket label 10a is that the latter is provided with a heat-resistant electrically insulating layer 6 between the metal layer 2 having deposited aluminum and the heat sensitive adhesive layer 3. Although the varnish layer 5 is not shown in FIG. 2, it may be added if necessary.

The electrically insulating layer 6 is formed by melting and extruding the resin in a thickness of 5 to 30 μm. The resin can be low-density polyethylene, polypropylene, an ethylene-methacrylic acid copolymer, an ethylene-acrylic acid copolymer, an ethylene-methyl methacrylate copolymer, or an ethylene-vinylacetate copolymer. As another method of forming the electrically insulating layer 6, a heat-shrinking film which is made of one of these resins can be accumulated by dry lamination or the like. As still another method, it is possible to coat a solution of an ethylene-methacrylic acid copolymer, an ethylene-vinylacetate copolymer, or polyester urethane resin. These resins to be used as the electrically insulating layer 6 contain substantially no additives such as tackifiers, and have a higher softening point than the resin used for the adhesive layer 3. It is preferable that the softening point is 80° C. or above in order to resist the use and the preservation of the battery in high-temperature conditions and the heat which is applied to make the heat sensitive jacket label 10a heat-shrink.

The above-described construction efficiently prevents the dissolution of the metal layer 2 even if the battery is preserved at high-temperature and high-humidity conditions, thereby preventing the loss of the metallic gloss of the heat sensitive jacket label 10a.

The following is a description of how the metal layer 2 is dissolved and how the above-described construction prevents the dissolution.

The jacket label 10a which is heat-shrinkable is wrapped around the battery while the heat sensitive adhesive layer 3 which is formed on the back surface of the base is melted by heat. The adhesive is hardened by cooling, and as a result, the jacket label 10a which is wrapped around the battery adheres to the battery. While the adhesive is hardened by cooling, the heat sensitive adhesive layer 3 develops pinholes or cracks. As a result, the metal layer 2 comes in contact with the battery case which is made of nickel plated steel or the like which also serves as a positive electrode terminal. Then, in the high-temperature and high-humidity conditions, local cells are generated between the battery case and the metal layer 2 through moisture in the air. As a result, aluminum is dissolved, and the jacket label 10a partly loses the metallic gloss.

The dissolution of aluminum tends to occur particularly at the top and bottom corners covering both ends of the jacket label 10a which protrude beyond the top and the bottom ends of the battery. The top and bottom corners have a high heat shrinkage degree and are vulnerable to the pressure of heat shrinkage. The cause of this is considered that at the top and bottom corners the heat sensitive adhesive layer 3 is pushed away because it heat-shrinks while being melted. Consequently, the metal layer 2 and the battery case come in direct contact with each other, and as a result, local cells are easily generated therebetween.

However, it is considered that the generation of the local cells and the resultant dissolution of the metal layer 2 are prevented by providing the heat-resistant electrically insulating layer 6 between the heat sensitive adhesive layer 3 and the metal layer 2, and particularly at the top and bottom corners of the battery.

Figure 3:
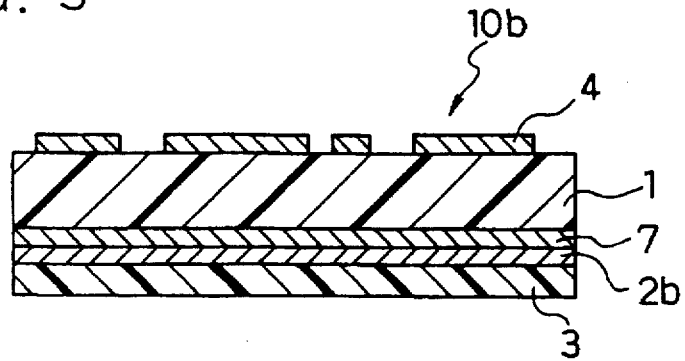
FIG. 3 is a sectional view of the construction of still another heat sensitive jacket label of the present invention.

FIG. 3 shows the construction of another heat sensitive jacket label 10b of the present invention. This jacket label 10b overcomes the dissolution of aluminum and the resultant lost of the metallic gloss by employing other metals than aluminum, instead of providing the heat-resistant electrically insulating layer 6. A metal layer 2b consisting of silver, tin, or nickel is used instead of the metal layer 2. The metal layer 2b can be formed by depositing silver, tin, or nickel or by spreading a paint containing the powder of either metal. The jacket label 10b further includes an anchor coat layer 7 which is provided on the metal layer 2b.

The following is a description of the method for applying the heat sensitive jacket label 10 to a dry battery.

Figure 4:
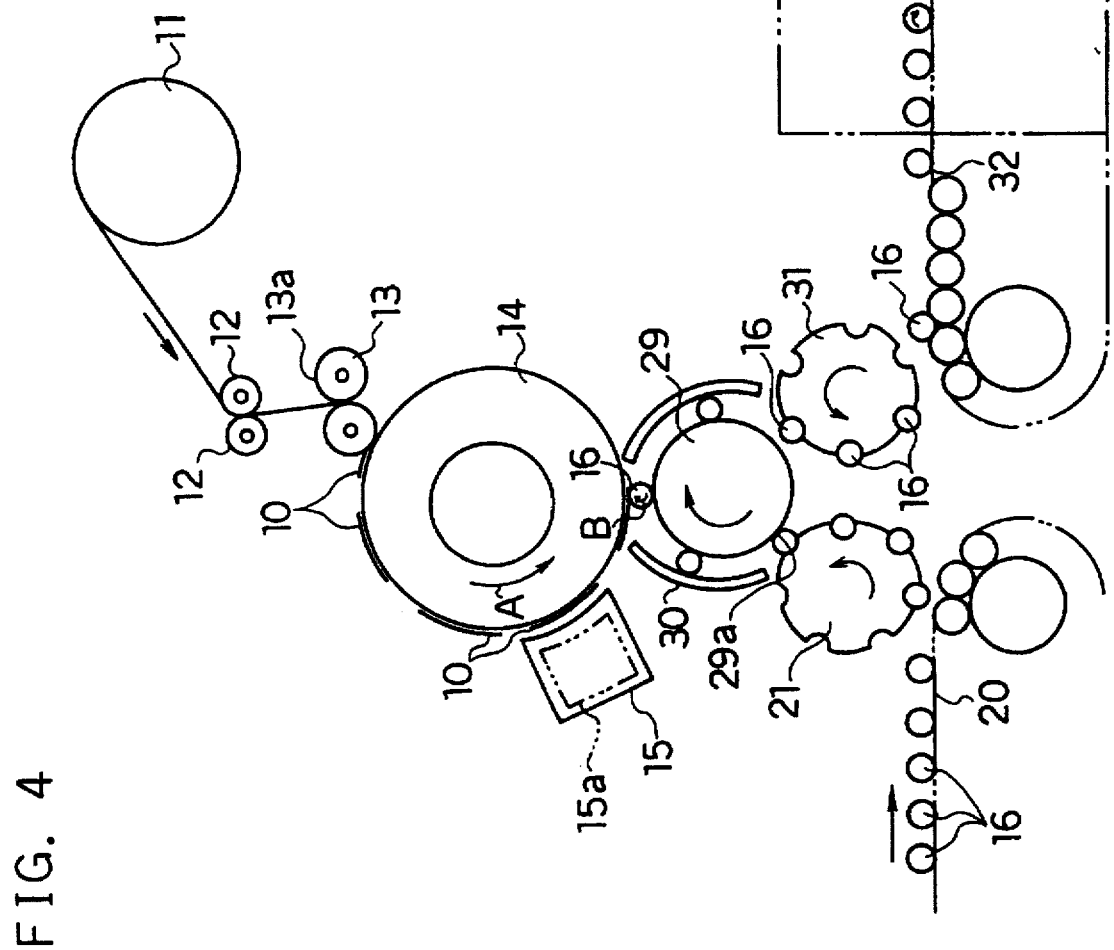
FIG. 4 is a schematic view of a device for applying heat sensitive jacket labels to batteries.

As shown in FIG. 4, a transfer roller 12 carries a rolled film 11 which is made up of the base 1, the aluminum deposit layer 2, and the heat sensitive adhesive layer 3 to a cutter 13a. The cutter 13a which is provided to a cutting roller 13 cuts the film 11 so as to form the heat sensitive jacket label 10 with a predetermined size.

Then, the heat sensitive jacket label 10 is sustained by suction over the outer surface of a rotation drum 14 with the heat sensitive adhesive layer 3 directed outward. The rotation drum 14 rotates in the direction A. When the rotation drum 14 has rotated to deliver the heat sensitive jacket label 10 to a heating device 15, a heater 15a of the heating device 15 heats the heat sensitive adhesive layer 3 up to a predetermined temperature. As a result, the heat sensitive adhesive which is contained in the heat sensitive adhesive layer 3 is activated and becomes adhesive. Although the base 1 is also heated at this moment, there is no change in the base 1. This is because the base 1 does not heat-shrink unless it is heated up to a temperature at least 15° C. higher than the temperature for the heat sensitive adhesive layer 3 to be activated, or shrinks only slightly (the heat shrinking rate is only 1% or less).

This heating operation may be conducted by heating the rotation drum 14 so that the heat sensitive jacket label 10 is heated on the heated rotation drum 14.

On the other hand, a conveyer 20 carries a dry battery 16, to which the heat sensitive jacket label 10 is supposed to be applied, to a transfer drum 21 having a holding unit. The transfer drum 21 further carries the dry battery 16 close to a supply drum 29. When the supply drum 29 receives the dry battery 16 on its surface, a holding unit 29a which is provided on the surface of the supply drum 29 carries the dry battery 16 close to the rotation drum 14 through a pair of guides 30.

Figure 6:
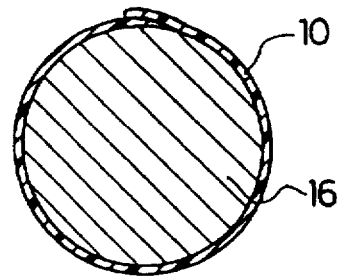
FIG. 6 is a cross-sectional view of the same battery.

When the heat sensitive jacket label 10 in which the heat sensitive adhesive layer 3 has been activated is carried to the rotation drum 14, the dry battery 16 which is held in the holding unit 29a of the supply drum 29 comes in contact with the surface of the rotation drum 14 along the rotation of the supply drum 29. Then, the rotation of the rotation drum 14 makes the dry battery 16 rotate in the direction B. As a result, the heat sensitive jacket label 10 which is on the surface of the rotation drum 14 is wrapped around the outer surface of the dry battery 16 as shown in FIG. 6.

Figure 5:
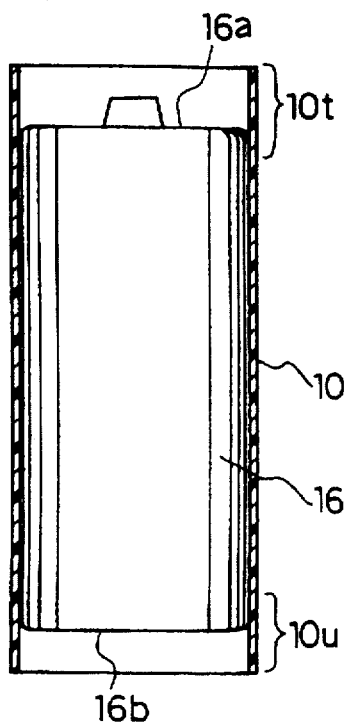
FIG. 5 is a longitudinal sectional view of a battery to which a jacket label has been applied.

Then, the supply drum 29 carries the dry battery 16 with the heat sensitive jacket label 10 to a transfer drum 31 and the transfer drum 31 carries the dry battery 16 onto a roller belt 32. At this moment, both ends of the heat sensitive jacket label 10 slightly protrude beyond the top end 16a and the bottom end 16b of the dry battery 16 as shown in FIG. 5.

Figure 7:
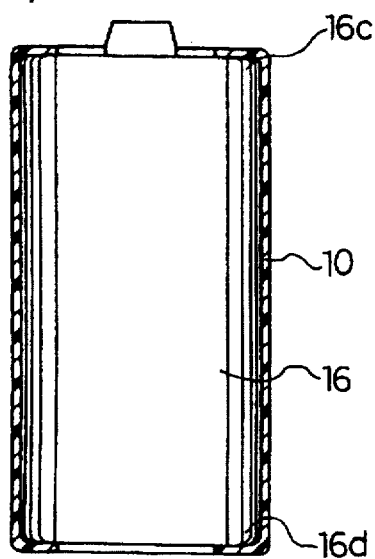
FIG. 7 is a longitudinal sectional view of a battery with a heat-shrunk heat sensitive jacket label.

After this process, the dry battery 16 with the heat sensitive jacket label 10 is carried to a heating device 33 which is heated up around 130° C. and heated there. As a result of this heating operation, both ends of the heat sensitive jacket label 10 which protrude beyond the top and the bottom ends 16a and 16b of the dry battery 16 heat-shrink in the direction of circumference, and cling to the top and bottom corners of the dry battery 16. Thus, the entire heat sensitive jacket label 10 is tightly adhered to the dry battery 16 as shown in FIG. 7.

As explained hereinbefore, the heat sensitive jacket label 10 which has been applied to the dry battery 16 without defective adhesion suffers from no wrinkles or distortion on the base, even if the heat sensitive adhesive layer 3 is activated at a temperature high enough to develop the adhesion. This is because there is a temperature difference of 15° C. or larger between the temperature for the heat sensitive adhesive layer to be activated and the temperature for the base to heat-shrink.

EMBODIMENT 1

Thirty different heat sensitive jacket labels which commonly have the construction shown in FIG. 1 were manufactured by combining five different heat-shrinking films A–E as the bases and six different heat sensitive adhesives "a"–"f". The heat-shrinking films A, B, C, D, and E heat-shrink around 70° C., 75° C., 80° C., 85° C., and 90° C., respectively. The heat sensitive adhesives "a", "b", "c", "d", "e", and "f" are activated at 55° C., 60° C., 65° C., 70° C., 75° C., and 80° C., respectively. These thirty heat sensitive jacket labels were applied to bodies of alkaline dry batteries LR6 to check the application conditions. The results are shown in Table 1. The symbol ○ indicates that the application condition was satisfactory, the symbol Δ indicates that there was slight shrinkage of the label but the application condition is permissible, and the symbol X indicates that the application was unsuccessful due to the occurrence of heat-shrinkage of the label before the application.

TABLE 1

| Adhesive | Activation temperature | Film A 70° C. | Film B 75° C. | Film C 80° C. | Film D 85° C. | Film E 90° C. | Blocking |
|---|---|---|---|---|---|---|---|
| a | 55° C. | Δ | O | O | O | O | some |
| b | 60° C. | X | Δ | O | O | O | none |
| c | 65° C. | X | X | Δ | O | O | none |
| d | 70° C. | X | X | X | Δ | O | none |
| e | 75° C. | X | X | X | X | Δ | none |
| f | 80° C. | X | X | X | X | X | none |

(Heat-shrinking temperature of the base)

As shown in Table 1, when the heat sensitive adhesive "b" having an activation temperature of 60° C. was applied to the heat-shrinking films C, D, and E, which heat-shrink at 80° C., 85° C., and 90° C., respectively, the application conditions of the heat sensitive jacket labels to dry batteries were satisfactory. When the heat sensitive adhesive "c" having an activation temperature of 65° C. was applied to the heat-shrinking films D and E, which heat-shrink at 85° C. and 90° C., respectively, and when the heat sensitive adhesive "d" having an activation temperature of 70° C. was applied to the heat-shrinking film E, the application conditions were all satisfactory.

These results indicate that when a heat sensitive adhesive which is activated at 60° C. is used, the heat-shrinking film must heat-shrink at a temperature higher than the activation temperature by at least 20° C. in order to obtain a satisfactory heat sensitive jacket label. When the heat sensitive adhesive "a" which is activated at 55° C. was applied to a heat-shrinking film which heat-shrinks at a temperature higher than the activation temperature by 15° C. or above, the heat sensitive jacket label was able to apply to the dry battery, but the application condition was not satisfactory because the heat sensitive jacket label suffered from a slight blocking before the application.

In conclusion, the most satisfactory heat sensitive jacket label can be obtained when the temperature for the heat sensitive adhesive layer to be activated is 60° C. or above and the temperature for the base to heat-shrink is higher than the activation temperature by at least 20° C.

EMBODIMENT 2

Batteries of Samples 2-1 to 2-5 of the present invention and batteries of Comparative examples 2-1 to 2-3 were manufactured as follows, based on the heat sensitive jacket label 10a shown in FIG. 2 which was characterized by the provision of the electrically insulating layer 6.

Sample 2-1

Batteries of this sample were manufactured as follows.

The base 1 shown in FIG. 2 is a uniaxially oriented film made of polyethylene terephthalate film with a thickness of 0.05 mm. The base 1 heat-shrinks if exposed to a temperature of 85° C. The base 1 heat-shrinks by 30% at 120° C. A metal layer 2 was formed on one surface of the base 1 by vacuum depositing aluminum. The electrically insulating layer 6 then was formed on the surface of the metal layer 2 by melting and extruding low-density polyethylene in a thickness of 0.01 mm. The adhesive layer 3 containing ethylene resin as its main component was formed on the surface of the heat-resistant electrically insulating layer 6. The print layer 4 was formed on the other surface of the base 1 with ultraviolet-setting ink by means of the relief rotary printing. Thus the heat sensitive jacket label is completed.

Then, the adhesive layer 3 was heated and the heat sensitive jacket label 10a was wrapped around the body of an alkaline dry battery LR6 having a nickel plated steel can. Both the ends of the heat sensitive jacket label which protrude beyond the top and the bottom ends of the alkaline dry battery LR6 were shrunk by applying hot air.

Sample 2-2

Batteries of this sample were manufactured in the same manner as in Sample 2-1 except that the heat-resistant electrically insulating layer 6 was formed by dry-laminating a 0.03 mm thick polyethylene terephthalate film which has been uniaxially oriented.

Sample 2-3

Batteries of this sample were manufactured in the same manner as in Sample 2-1 except that the heat-resistant electrically insulating layer 6 was formed by spreading an ethylene-methacrylic acid copolymer resin solution to be 0.006 mm thick.

Sample 2-4

Batteries of this sample were manufactured in the same manner as in Sample 2-3 except that the heat-resistant electrically insulating layer 6 was formed exclusively on the top and the bottom ends 10t and 10u shown in FIG. 5 on the surface of the metal layer 2. The ends 10t and 10u correspond to the top and bottom ends 16c and 16d of the battery shown in FIG. 7.

Sample 2-5

Batteries of this sample were manufactured in the same manner as in Sample 2-4 except that the heat-resistant electrically insulating layer 6 was formed on the surface of the metal layer 2 except for the top and the bottom ends 10t and 10u.

Comparative Example 2-1

Batteries of this comparative example were manufactured in the same manner as in Sample 2-1 except that the heat-resistant electrically insulating layer 6 was not provided, so that the adhesive layer 3 consisting of a heat sensitive adhesive was in a direct contact with the metal layer 2.

Comparative Example 2-2

Batteries of this comparative example were manufactured in the same manner as in Sample 2-1 except that the adhesive layer 3 was made of an acrylic acid-ethylene copolymer which was pressure sensitive, the heat-resistant electrically insulating layer 6 was made of polyethylene resin, and that the heat-resistant electrically insulating layer 6 was formed on the entire surface of the metal layer 2.

Comparative Example 2-3

Batteries of this comparative example were manufactured in the same manner as in Sample 2-1 except that the heat-resistant electrically insulating layer 6 was not provided, so that the adhesive layer 3 consisting of a pressure sensitive adhesive which was made of acrylic acid-ethylene copolymer was in a direct contact with the metal layer 2.

One-hundred batteries of each of Samples 2-1 to 2-5 and Comparative examples 2-1 to 2-3 were preserved for one week under the conditions of a temperature of 60° C. and a humidity of 90%. Then, the number of batteries was checked which lost metallic gloss or had other damage on the appearance of their jacket labels. The results are shown in Table 2 below.

TABLE 2

|  | Number of batteries with damaged labels |
| --- | --- |
| Sample 2-1 | 0/100 |
| Sample 2-2 | 0/100 |
| Sample 2-3 | 0/100 |
| Sample 2-4 | 0/100 |
| Sample 2-5 | 5/100 |
| Comparative example 2-1 | 95/100 |
| Comparative example 2-2 | 0/100 |
| Comparative example 2-3 | 0/100 |

As shown in Table 2, the batteries of Samples 2-1 to 2-5 with heat sensitive adhesives showed much lower incidence of defective jacket labels than those of Comparative example 2-1. It has also been proved that it is effective to provide a heat-resistant electrically insulating layer on both ends of the surface of the metal layer 2 that correspond to the top and bottom corners of the battery.

In the batteries of Comparative examples 2-2 and 2-3 with pressure sensitive adhesives, no damage occurred regardless of the presence or absence of the heat-resistant electrically insulating layer. This result indicates that to provide a heat-resistant electrically insulating layer is effective exclusively for a battery which employs a heat sensitive adhesive in the jacket label.

EMBODIMENT 3

Batteries of Samples 3-1 to 3-2 of the present invention and batteries of Comparative examples 3-1 to 3-2 were manufactured as follows, based on the heat sensitive jacket label 10b shown in FIG. 3 which was characterized in that the metal layer was made of either silver, tin, or nickel.

Sample 3-1

Batteries of this sample were manufactured as follows.

The base 1 was made of a uniaxially oriented polyethylene terephthalate film with a thickness of 50 μm. If heated, this resin shrinks by 30% in the oriented direction. Then, a deposit anchor coat 7 was formed on one surface of the base 1 by depositing acrylic resin, polyurethane resin, polyester resin or the like. The metal layer 2 was formed on the deposit anchor coat 7 by vacuum depositing either silver, tin, or nickel in a thickness of 0.05 μm. The heat sensitive adhesive layer 3 was formed on the metal layer 2b by uniformly spreading a 30 g/m² hot melt adhesive which consists mainly of polyethylene. On the other surface of the base 1, a design printing 4 was formed with ultraviolet-setting ink. Thus, a heat sensitive jacket label was completed.

The jacket label thus manufactured was cut into a predetermined size, wrapped around bodies of alkaline manganese dry batteries LR6 with nickel steel cases, and heat-shrank.

Sample 3-2

Batteries of this sample were manufactured as follows. Firstly, a paint with metallic gloss was manufactured as follows. Either one of silver, tin, or nickel was pulverized into a powder having an average particle diameter of 10 μm, and 30% by weight of this powder was mixed with a transparent paint containing either nitrocellulose polyamide resin, acrylic resin, or polyurethane resin as a binder. Then, 5 g/m² of the paint was thinly and uniformly spread over the surface of the base 1 which was made of the same heat-shrinking resin film as used in Sample 3-1. Furthermore, a 30 g/m² hot melt adhesive which contained polyethylene as the main component was spread thinly and uniformly over the surface of the paint in the same manner as in Sample 3-1. On the other surface of the base 1, a design printing was formed with ultraviolet-setting ink.

Comparative Example 3-1

Batteries of this comparative example were manufactured as follows. After an anchor coat was applied on the base 1 which was made of the same heat-shrinking resin film as Sample 3-1, aluminum was deposited on the anchor coat. Then, a pressure sensitive adhesive was spread over the deposited aluminum.

Comparative Example 3-2

Batteries of this comparative example were manufactured as follows. The same heat sensitive adhesive as used in Sample 3-1 was used instead of the pressure sensitive adhesive which was used in Comparative example 3-1. The metal layer was made by depositing aluminum.

One-hundred dry batteries of each of Samples 3-1 and 3-2 and Comparative examples 3-1A and 3-2C were preserved in a tank at a temperature of 45° C. and a humidity of 90% for three days. Then, the number of batteries was checked which lost metallic gloss or had other damage on the appearance of their jacket labels. The results are shown in Table 3 below. In Table 3, Sample 3-1 is divided into Sample 3-1A, Sample 3-1B, and Sample 3-1C which employ silver, tin, and nickel, respectively, as the metal layer. Also, Sample 3-2 is divided into Sample 3-2A, Sample 3-2B, and Sample 3-2C which employ silver, tin, and nickel, respectively, as the metal layer.

TABLE 3

| | Material | Metal layer forming method | Metal | Number of batteries with damaged label |
|---|---|---|---|---|
| Comparative example 3-1 | Pressure sensitive adhesive | Vacuum deposition | Al | 2/100 |
| Comparative example 3-2 | Heat sensitive adhesive | | | 39/100 |
| Sample 3-1A | | | Ag | 0/100 |
| Sample 3-1B | | | Sn | 0/100 |
| Sample 3-1C | | | Ni | 0/100 |
| Sample 3-2A | | Spreading of transparent paint containing metal powder | Ag | 0/100 |
| Sample 3-2B | | | Sn | 0/100 |
| Sample 3-2C | | | Ni | 0/100 |

As apparent from Table 3, a jacket label which was manufactured by depositing either silver, tin, or nickel to the base was not damaged in the high-temperature and high-humidity conditions. It has been proved that besides the deposition, a jacket label can be manufactured by coating a transparent paint in which such a metal is added in the form of powder to give metallic gloss.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A heat sensitive jacket label for a battery comprising a base made of a heat-shrinking synthetic resin film and a heat sensitive adhesive layer provided on one surface of said base, wherein a temperature for inducing a heat-shrink of said base is at least 15° C. higher than a temperature for effecting adhesion of said heat sensitive adhesive layer.

2. The heat sensitive jacket label in accordance with claim 1, wherein the temperature for inducing a heat-shrink of said base is at least 20° C. higher than the temperature for effecting adhesion of said heat sensitive adhesive layer.

3. The heat sensitive jacket label in accordance with claim 1, wherein the temperature for effecting adhesion of said heat sensitive adhesive layer is 60° C. or above.

4. The heat sensitive jacket label in accordance with claim 1 further comprising a metal deposit layer and a heat-resistant electrically insulating layer which are disposed between said base and said heat sensitive adhesive layer, said metal deposit layer being disposed on one surface of said base, and said heat-resistant electrically insulating layer being disposed on said metal deposit layer.

5. The heat sensitive jacket label in accordance with claim 4, wherein said heat-resistant electrically insulating layer is made of synthetic resin whose softening temperature is higher than a softening temperature of said heat sensitive adhesive layer.

6. The heat sensitive jacket label in accordance with claim 1 further comprising a metal layer disposed between said base and said heat sensitive adhesive layer, said metal layer comprising one of silver, tin, and nickel.

7. A battery with a jacket label, said jacket label comprising a base made of a heat-shrinking resin film, and a metal layer and an adhesive layer which are disposed on a back surface of the base in this order, wherein said adhesive layer consists of a heat sensitive adhesive, and said base is made of resin which heat-shrinks at a temperature at least 15° C. higher than a temperature for effecting adhesion of said heat sensitive adhesive layer.

8. The battery with a jacket label in accordance with claim 7 further comprising a heat-resistant electrically insulating layer between said metal layer and said adhesive layer.

9. The battery with a jacket label in accordance with claim 7, wherein said metal layer comprises one of silver, tin, and nickel.

10. A battery comprising:

a cylindrical body of the battery, and a jacket label which is wrapped around said cylindrical body of the battery in a manner that top and bottom ends of said jacket label protrude beyond top and bottom ends of said cylindrical body, said top and bottom ends of said jacket label being clung to top and bottom corners covering the top and the bottom ends of said cylindrical body by heat-shrink, wherein said jacket label comprises a base made of a heat-shrinking resin film, a metal layer provided on a back surface of said base, a heat-resistant electrically insulating layer provided on said metal layer, and a heat sensitive adhesive layer provided on said heat-resistant electrically insulating layer.

11. The battery with a jacket label in accordance with claim 10, wherein said base heat-shrinks at a temperature at least 15° C. higher than a temperature for effecting adhesion of said heat sensitive adhesive layer.

12. The battery with a jacket label in accordance with claim 11, wherein said heat-resistant electrically insulating layer is made of synthetic resin whose softening temperature is higher than a softening temperature of said heat sensitive adhesive layer.

13. A battery comprising:

a cylindrical body of the battery, and a jacket label which is wrapped around a cylindrical body of the battery in a manner that top and bottom ends of said jacket label protrude beyond top and bottom ends of said cylindrical body, said top and bottom ends of said jacket label being clung to top and bottom corners covering the top and the bottom ends of said cylindrical body by heat-shrink, wherein said jacket label comprises a base made of a heat-shrinking resin film, a metal layer provided on a back surface of said base, a heat sensitive adhesive layer provided on said metal layer, and a heat-resistant electrically insulating layer which is provided between said heat-resistant electrically insulating layer and said heat sensitive adhesive layer to cover at least the top and the bottom corners of said cylindrical body.

* * * * *

UNITED STATES PATENT AND TRADEMARK OFFICE
CERTIFICATE OF CORRECTION

PATENT NO. : 5,725,966
DATED : March 10, 1998
INVENTOR(S) : Masanobu Aba; Takeshi Okubo; Carl David Walton; Junichi Asaoka; Yasuhiko Shoji; Tetsuo Hata; Masakazu Hirayama; & Takeshi Kyogane It is certified that error appears in the above-indentified patent and that said Letters Patent is hereby corrected as shown below:

Column 12, line 60 (Claim 13, line 15 thereof), replace "heat-resistant electrically insulating" with -- metal --.

Signed and Sealed this

Twelfth Day of September, 2000

*Attest:*

Q. TODD DICKINSON

*Attesting Officer*      *Director of Patents and Trademarks*